(12) United States Patent
Teichrob et al.

(10) Patent No.: US 11,286,116 B2
(45) Date of Patent: Mar. 29, 2022

(54) PROPPANT METERING AND LOADING IN A HYDRAULIC FRACTURING BLENDER

(71) Applicant: TY-CROP MANUFACTURING LTD., Rosedale (CA)

(72) Inventors: Gary Wayne Teichrob, Rosedale (CA); Ian Breeweg, Chilliwack (CA); Kevin James Standeven, Rosedale (CA)

(73) Assignee: Ty-Crop Manufacturing Ltd., British Columbia (CA)

( * ) Notice: Subject to any disclaimer, the term of this patent is extended or adjusted under 35 U.S.C. 154(b) by 0 days.

(21) Appl. No.: 16/936,690

(22) Filed: Jul. 23, 2020

(65) Prior Publication Data

US 2021/0024291 A1    Jan. 28, 2021

Related U.S. Application Data

(60) Provisional application No. 62/879,116, filed on Jul. 26, 2019.

(51) Int. Cl.
| | |
|---|---|
| *B65G 15/30* | (2006.01) |
| *B65G 47/19* | (2006.01) |
| *B65G 39/02* | (2006.01) |
| *E21B 43/26* | (2006.01) |

(52) U.S. Cl.
CPC ............ *B65G 15/30* (2013.01); *B65G 39/02* (2013.01); *B65G 47/19* (2013.01); *B65G 2203/0258* (2013.01); *B65G 2203/042* (2013.01); *B65G 2811/095* (2013.01); *B65G 2814/032* (2013.01); *B65G 2814/0344* (2013.01); *E21B 43/2607* (2020.05)

(58) Field of Classification Search
CPC ........ B65G 15/30; B65G 39/02; B65G 47/19; B65G 2203/0258; B65G 2203/042; B65G 2811/095; B65G 2814/032; B65G 2814/0344; E21B 43/2607
USPC .......................................................... 198/532
See application file for complete search history.

(56) References Cited

U.S. PATENT DOCUMENTS

| | | | |
|---|---|---|---|
| 6,283,269 B1 | 9/2001 | Mayer | |
| 6,329,613 B1 * | 12/2001 | Tomlinson | ............. G01G 11/00 |
| | | | 177/145 |
| 7,467,707 B1 | 12/2008 | Gabhart | |
| 10,759,610 B1 | 9/2020 | Allegretti et al. | |
| 10,836,568 B2 * | 11/2020 | Managan, II | ........... B01F 3/188 |

(Continued)

FOREIGN PATENT DOCUMENTS

| | | | | |
|---|---|---|---|---|
| CA | 2975902 A1 * | 1/2017 | ................ | B01F 7/16 |
| CA | 2964009 A1 * | 12/2017 | | |
| GB | 2204847 A | 11/1988 | | |

*Primary Examiner* — Gene O Crawford
*Assistant Examiner* — Lester Rushin, III
(74) *Attorney, Agent, or Firm* — Meunier Carlin & Curfman LLC

(57) ABSTRACT

A proppant metering and loading apparatus for a hydraulic fracturing blender unit is provided. A continuous loop conveyor belt receives proppant from a source location on the blender, such as a hopper, and delivers the proppant to a blender device of the blender. A measurement device (e.g. weigh scale) measures and provides an indication of amount (e.g. weight, volume and/or density) of the proppant delivered to the blender device by the conveyor belt.

19 Claims, 8 Drawing Sheets

(56) References Cited

U.S. PATENT DOCUMENTS

| | | | |
|---|---|---|---|
| 2013/0105166 A1* | 5/2013 | Medvedev | E21B 21/062 |
| | | | 166/308.1 |
| 2015/0044003 A1* | 2/2015 | Pham | B65D 88/54 |
| | | | 414/332 |
| 2019/0248578 A1* | 8/2019 | Managan, II | B65G 65/42 |
| 2020/0048985 A1* | 2/2020 | Oehler | B65G 65/40 |
| 2020/0399075 A1 | 12/2020 | Allegretti et al. | |

* cited by examiner

400

410 Transport proppant from a source location on the hydraulic fracturing blender unit (e.g. a hopper) to a blender tub on the hydraulic fracturing blender unit, using a continuous loop conveyor belt.

420 Measure, using a measurement device (e.g. weigh scale, optical device or radiometric device) operatively coupled to the continuous loop conveyor belt, an amount (e.g. weight or volume) of the proppant delivered to the blender tub by the continuous loop conveyor belt.

430 Control rate of flow of proppant onto the continuous loop conveyor belt using a metering gate.

FIG. 4

PROPPANT METERING AND LOADING IN A HYDRAULIC FRACTURING BLENDER

CROSS-REFERENCE TO RELATED APPLICATIONS

This application claims the benefit of priority to U.S. Patent Application Ser. No. 62/879,116 entitled "PROPPANT METERING AND LOADING IN A HYDRAULIC FRACTURING BLENDER" filed Jul. 26, 2019, which is hereby incorporated by reference in its entirety.

FIELD OF THE INVENTION

The present invention pertains to the field of hydraulic fracturing blender equipment, and in particular to components for metering and loading proppant in such blender equipment.

BACKGROUND

In hydraulic fracturing operations, a fracturing fluid, such as a sand/water slurry, is driven into an oil and gas well at high pressure. The fluid, which can include various chemicals and materials in addition to proppant (e.g. sand) mixed in water, is mixed by a device called a blender by combining measured amounts of different ingredients, such as proppant, chemicals, and water. The fluid is initially mixed from its constituent materials in a blender, and then transferred to a fracturing apparatus for pumping into the well. The blender typically includes intake manifolds for receiving water and other liquids to be blended, one or more blending or mixing devices, such as but not necessarily limited to blending (mixing) tubs or blending (mixing) pumps (in which slurry is both mixed and pressurized), and discharge-side manifolds for providing the produced fluid, as well as other components such as proppant (and/or sand) augers for feeding the proppant into the blending or mixing devices. The blender can be a standalone device, for example mounted on a trailer bed for mobility.

In a typical implementation, a number (e.g. three) of augers, which can be regarded as Archimedean screw devices, are used to transfer the proppant from a source toward the blending or mixing device. However, such augers suffer from several drawbacks.

First, augers are prone to jamming. Some fracturing proppants are designed to flow into crevices and lock in place. When an auger stops spinning, proppant tends to compact between the auger screw and the outer tube holding same, causing the auger to jam. Second, metering proppant fed via an auger is problematic. The maximum flow rate of an auger is typically not met because the auger interior is not filled completely. Some proppant can run downward through gaps between the auger screw and outer tube. Determining material flow rate is problematic and inaccurate due to the need to track several variables, such as the amount of proppant in an intake hopper (from which the augers draw proppant), the location at which the proppant is falling into the hopper, and the type of proppant being used. Furthermore, the actual material flow rate is not directly proportional to the auger rotation rate. This is because as the auger speed increases, less proppant is taken in thereby per unit time. Third, augers are not particularly efficient in terms of the amount of power consumed to provide a particular material flow rate.

In particular, it is important to accurately measure proppant flow rates in order to produce the correct type of fracturing slurry in order to maximize future well production. One workaround solution is to use a nuclear densitometer to measure the density of the fracturing slurry. Based on this measure density and a measurement of the amount of water metered into the slurry, a calculation can be made to indicate the amount of proppant in the slurry. However, such densitometers can be inaccurate, difficult and expensive to maintain and calibrate, and difficult to transport across borders due to radioactive contents.

Therefore there is a need for a hydraulic fracturing blender and components thereof that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a proppant metering and loading apparatus for a hydraulic fracturing blender unit.

In accordance with embodiments of the present invention, there is provided a proppant metering and loading apparatus for a hydraulic fracturing blender unit, comprising: a continuous loop conveyor belt located at the blender unit and configured to receive proppant from a source location at the hydraulic fracturing blender unit and deliver the proppant to a blender device (e.g. a blending (also referred to as mixing) tub or pump) at the hydraulic fracturing blender unit; and a measurement device (e.g. weigh scale, optical scanner, or radiometric device) operatively coupled to the continuous loop conveyor belt and configured to provide an indication of amount (e.g. weight) of the proppant delivered to the blender device by the continuous loop conveyor belt. In some embodiments, the apparatus may further include a metering gate configured to control a rate of flow of the proppant onto the continuous loop conveyor belt. The conveyor and related equipment can be part of the blender unit or else separate from (e.g. adjacent to) the blender unit.

In some embodiments, the apparatus may be mounted to the chassis of the fracturing blender, while in other embodiments the apparatus may operate adjacent to the blender chassis. In some embodiments, the apparatus may be trailered to the operations site separately and set up adjacent to the fracturing blender.

In accordance with embodiments of the present invention, there is provided a hydraulic fracturing blender unit comprising the proppant metering and loading apparatus as described above.

In accordance with embodiments of the present invention, there is provided a method for loading proppant to a blender device of a hydraulic fracturing blender unit, the method including transporting proppant from a source location at the hydraulic fracturing blender unit to a blender device at the hydraulic fracturing blender unit, using a continuous loop conveyor belt at (e.g. mounted on or adjacent to) the blender unit; and measuring, using a measurement device operatively coupled to the continuous loop conveyor belt, an amount of the proppant delivered to the blender device by the continuous loop conveyor belt. The method may further include controlling the rate of flow of proppant onto the continuous loop conveyor belt using a metering gate.

BRIEF DESCRIPTION OF THE FIGURES

Further features and advantages of the present invention will become apparent from the following detailed description, taken in combination with the appended drawings, in which:

FIG. 4 illustrates a method for loading proppant to a blender device of a hydraulic fracturing blender unit, according to an embodiment of the present invention.

It will be noted that throughout the appended drawings, like features are identified by like reference numerals.

DETAILED DESCRIPTION

Figure 1A:
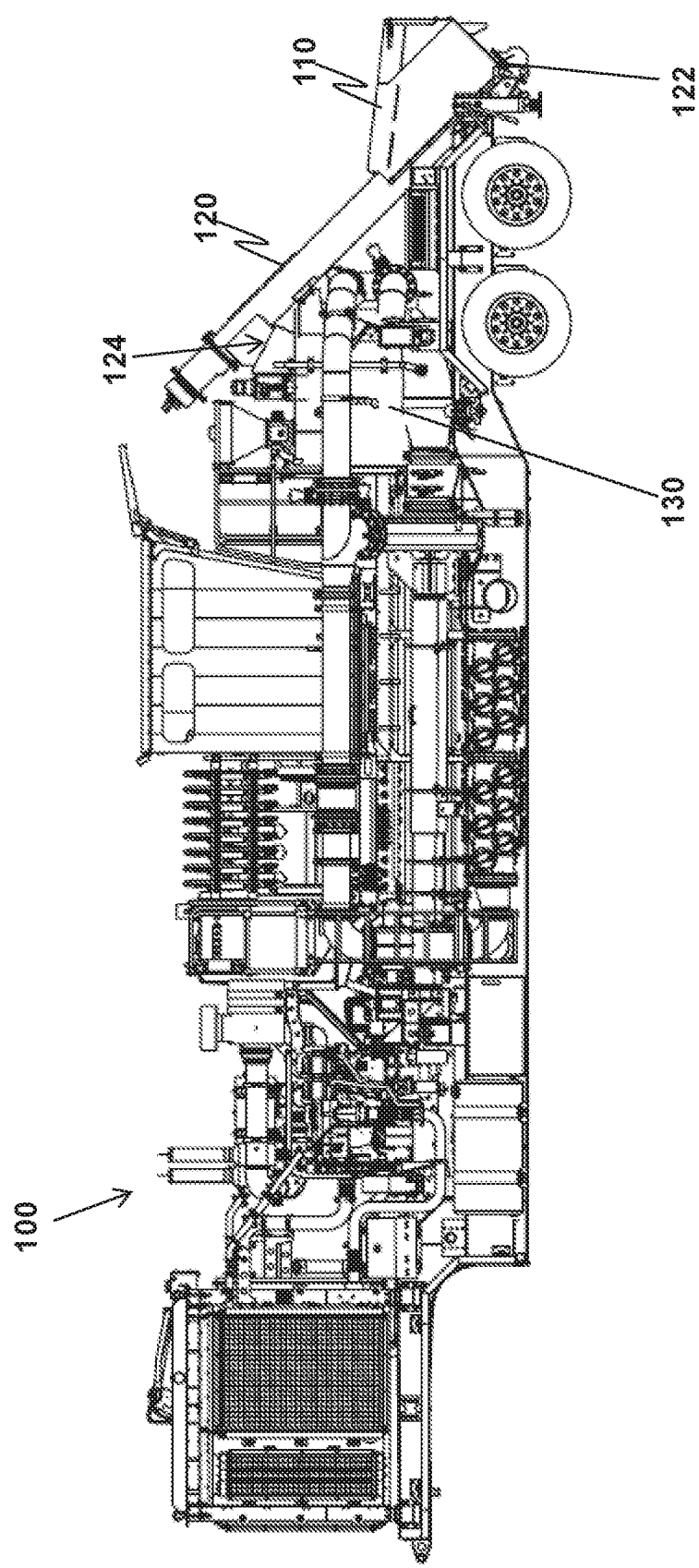
FIGS. 1A and 1B illustrate an example hydraulic fracturing blender unit according to the prior art.

Embodiments of the present invention provide a proppant loading and metering apparatus for use in a hydraulic fracturing blender. In particular, rather than using augers, the proppant metering apparatus uses a conveyor belt to move proppant from a source location into a blending or mixing device of the hydraulic fracturing blender. Advantages of this configuration will be apparent from the description below. The terms "blending" and "mixing" are used interchangeably. Furthermore, in various embodiments, the proppant metering apparatus includes a measurement device (e.g. a weigh scale, optical system, or radiometric device) for measuring an amount of proppant fed into the blending or mixing device (e.g. by weight or volume). The measurement device can be integrated with the conveyor belt.

Embodiments of the present invention provide a hydraulic fracturing blender comprising the above-described proppant metering apparatus. The hydraulic fracturing blender includes components for receiving and mixing solid and liquid ingredients to form a hydraulic fracturing slurry, also known as fracturing fluid. The ingredients include sand or other proppant, chemicals, and liquid such as water. One or more blending tubs with motorized mixing mechanisms, and suitable pumps or other fluid material moving devices may also be included as part of the blender.

It has been observed by the inventors that a single conveyor belt can move the same amount of proppant as multiple (e.g. three) augers with significantly less power requirement. For example, a 50 HP conveyor belt may be able to perform the equivalent function (in terms of moving proppant from source to destination at a given rate) as three 60 HP augers. As another example, a 25 HP conveyor may be able to perform the equivalent function as three 100 HP augers. It has also been observed by the inventors that the combination of a conveyor belt and a measurement device such as a weigh scale or other device can allow for significantly more accurate measurement of proppant flow. For example, in one case, the conveyor belt and weigh scale combination was observed to measure proppant flow by weight within 1% error. In contrast, augers can be limited to a 15% error tolerance. It has also been observed by the inventors that inclined conveyors are reliable and robust, with significantly less breakdown or jamming when compared to augers.

It has also been observed by the inventors that providing a conveyor weighing solution allows for simplification of the blender control system. In examples of the prior art, the control system would have to be informed of the diameter, pitch, angle, and a changing calibration factor for each of the installed augers. Using this, the control system would estimate proppant rate based on the auger(s) RPM. As the efficiency of the augers change as they wear, the calibration factor would be updated to approximately match the reported flow of any installed flow meters or densitometers.

In some embodiments, the apparatus includes a separate control system. The blender control system may request a desired rate from the conveyor control system, and receive the current rate back. This separate control system integrated with the apparatus takes care of adjusting belt speed and/or metering gate aperture to match the requested rate.

In some embodiments, the conveyor control system automatically adjusts the conveyor belt speed to match the requested proppant rate to maximize accuracy. A low belt speed provides better accuracy at low rates, but a high belt speed is needed to deliver higher rates, otherwise the proppant may build up too high on the belt. The metering gate aperture controls the actual material flow.

Augers were conventionally preferred in blending applications for example because they are designed to lift fluid material upward either vertically or along a sloped trajectory. In contrast, continuous loop belt conveyors are conventionally thought of as being limited to applications in which material is conveyed along a relatively flat or less steep slope. This is due to the concern about material rolling downward while the conveyor attempts to move the same material upward. However, despite the conventional knowledge, it has been recognized by the inventors, and verified through substantial testing, that the continuous loop belt conveyor does not suffer overly from such drawbacks in the application domain of proppant material delivery, and, even further, the continuous loop belt conveyor actually outperforms the auger in terms of efficiency, reliability, accuracy of flow delivery, or a combination thereof. It is also recognized that augers are subject to jamming when used to move proppant, which is intended to lodge in crevices such as those occurring in an auger interior.

Augers deliver the proppant into the blender tub in pulses, which may produce more dust and introduce additional air into the slurry. These pulses are inherent to the design of augers, which transports pockets of proppant within their screws rather than a steady stream. This is particularly true for augers configured to convey material up a sloped incline. The air introduced by the pulsed delivery can cause or increase cavitation that occurs at the discharge pump of the blender. Dust is also required to be minimized to reduce occupational exposure to silica dust. Delivering proppant in a steady stream via conveyor minimizes both dust and introduced air.

In some embodiments, because both the amount of proppant content and the amount of water content in a hydraulic fracturing slurry are accurately measured by direct effort (e.g. prior to blending), a nuclear densitometer may no longer be necessary. Instead, a simple flow meter for measuring flow of the slurry can be used on the blender. In other embodiments, the flow meter may be omitted, or used to provide a secondary check capability to verify other forms of metering. This may be the case for example when the amount of proppant, water and other chemicals forming the fracturing fluid are known in advance.

The conveyor belt may be a continuous-loop type conveyor belt. The surface of the belt can be flat, or the belt can incorporate protrusions or a series of buckets or scoops, straight ridges or shaped ridges such as chevrons, or the like, to inhibit material rollback on the upwardly angled portion of the conveyor.

Figure 1B:
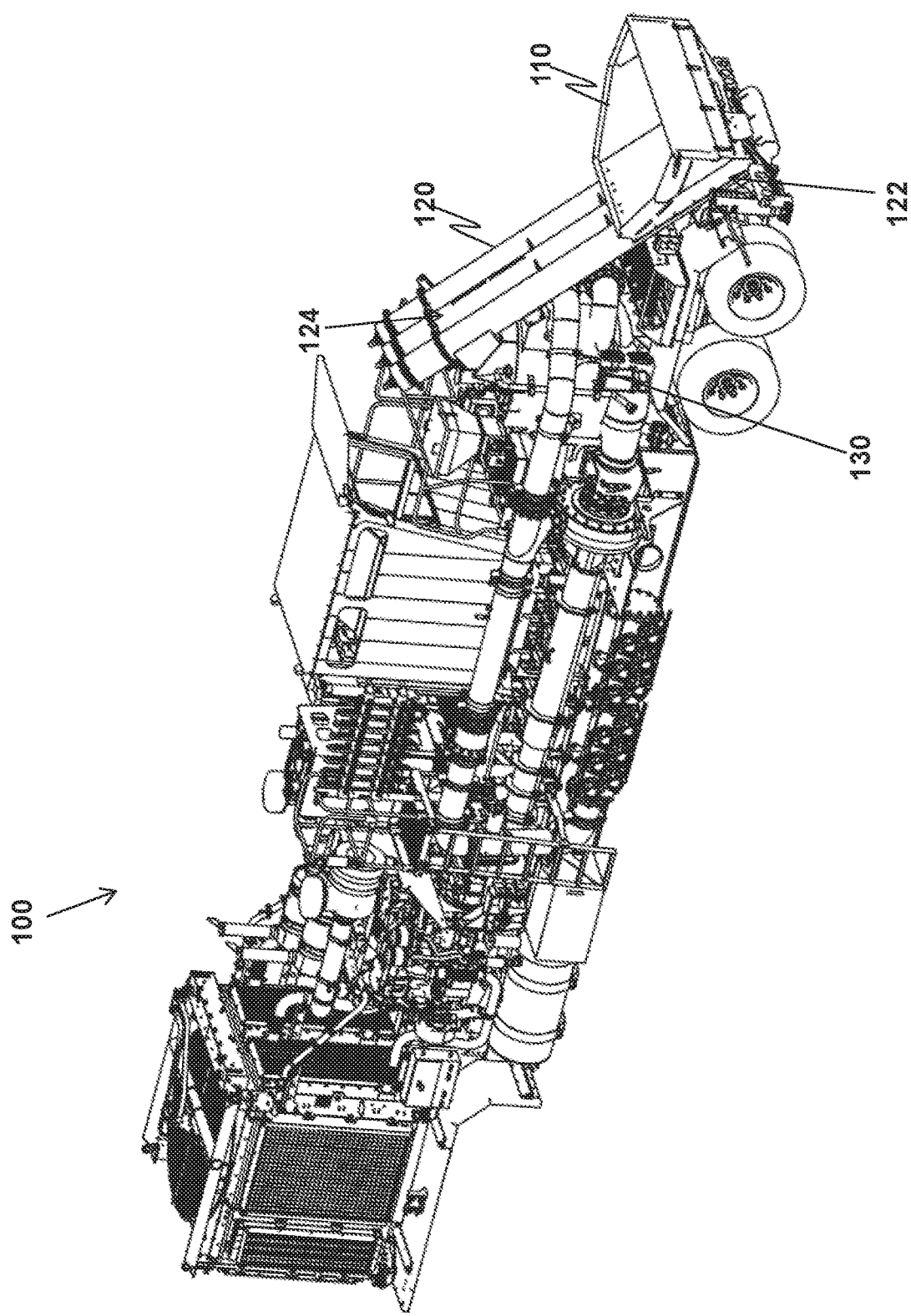

FIGS. 1A and 1B illustrate a hydraulic fracturing blender unit 100 having augers 120, according to a representation of the prior art. Three augers are shown, housed in cylindrical tubes. The helical auger screws are housed in the tubes. An intake container 110 is located at a bottom end 122 of the augers 120 and is loaded with proppant material. The augers draw proppant from the intake container and carry it upward at an inclined angle to a top end 124. The ends of the auger screws extend into the intake container 110, to be buried in proppant held therein. At the top end, the augers release the drawn proppant downward into a blending device 130.

Figure 2A:
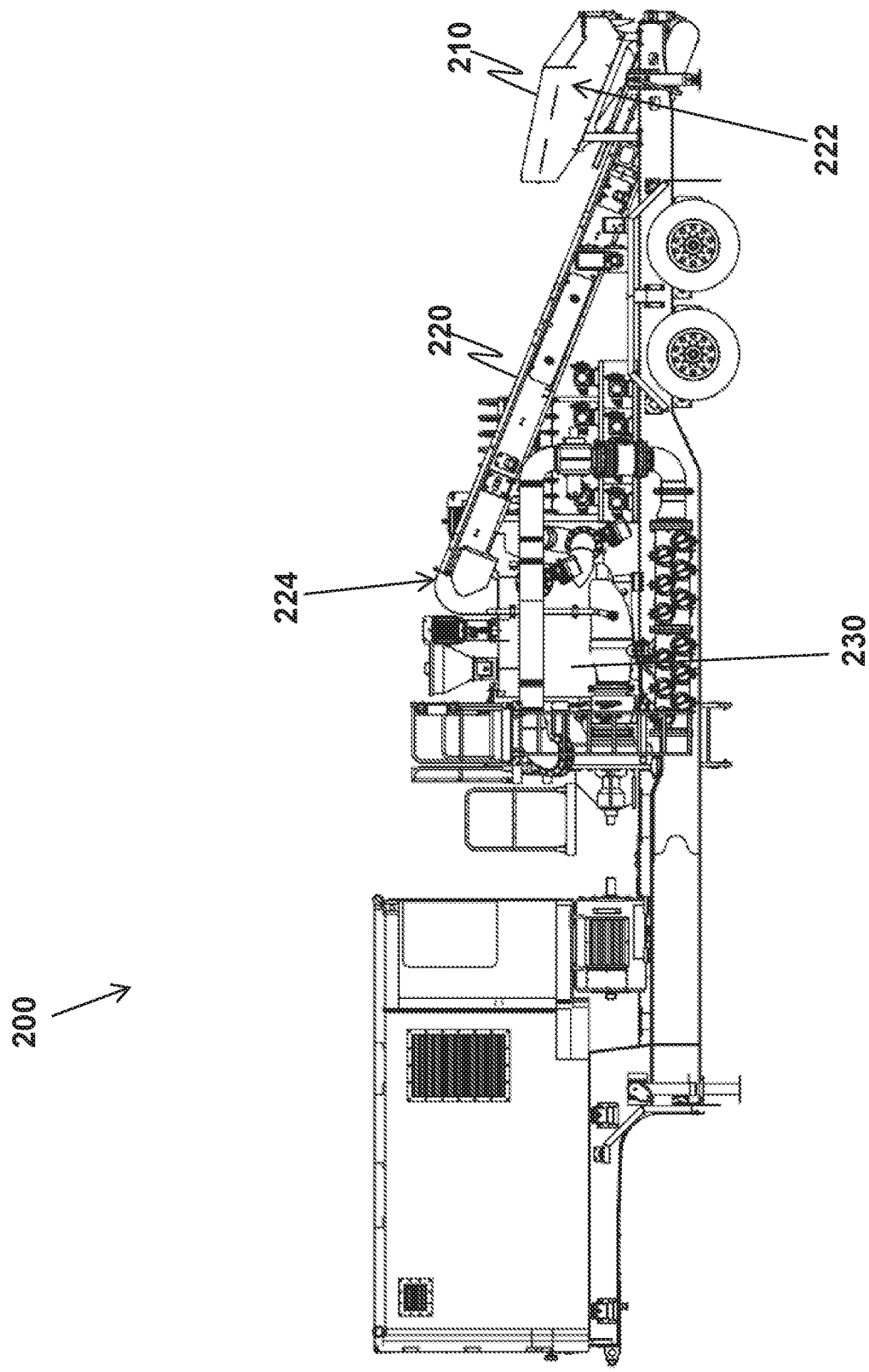
FIGS. 2A and 2B illustrate a hydraulic fracturing blender unit according to an embodiment of the present invention.
Figure 2B:
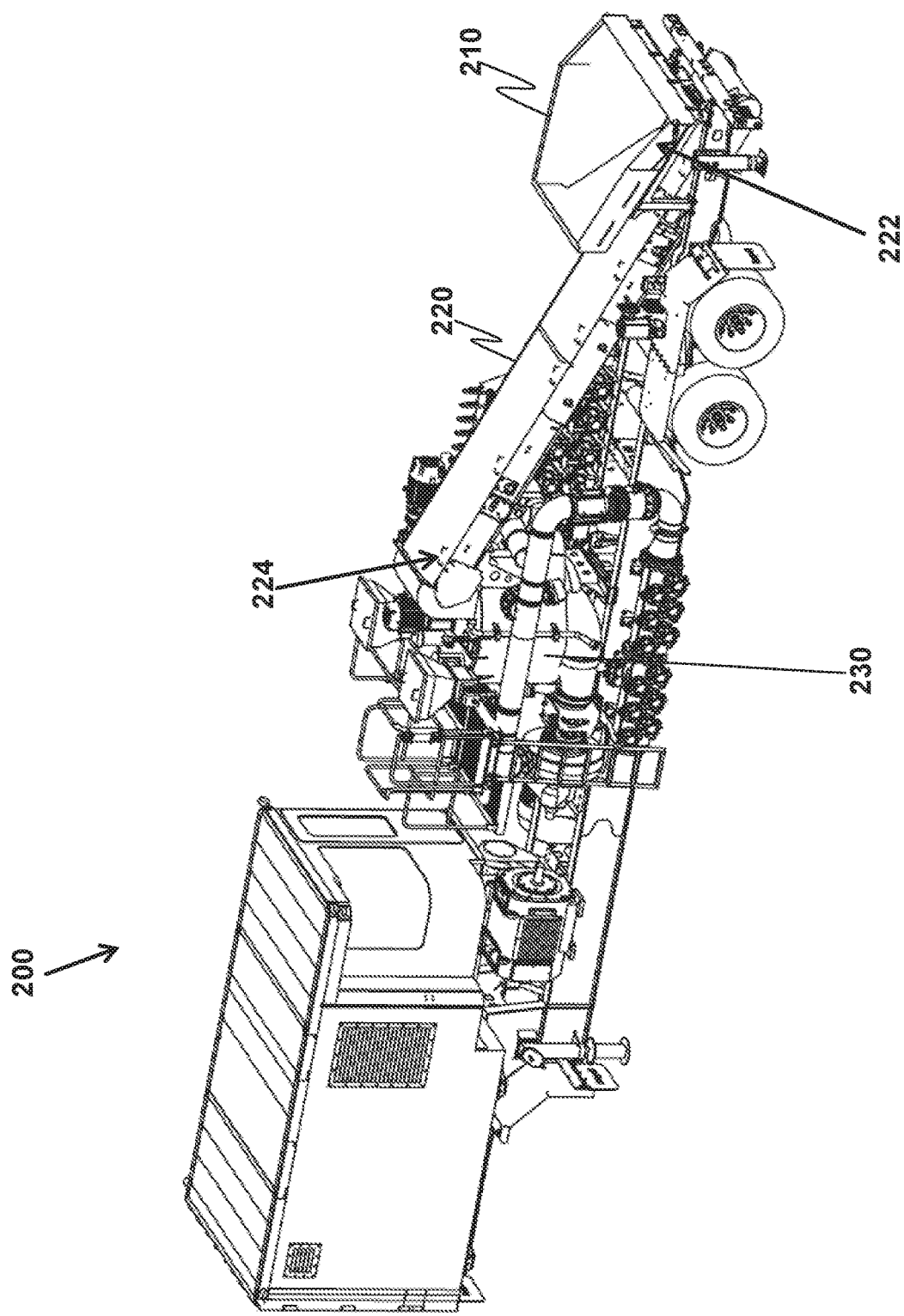

FIGS. 2A and 2B illustrate a hydraulic fracturing blender unit 200 having a belt conveyor 220 and weigh scale system (not visible), according to an embodiment of the present invention. A hopper 210 is located at a bottom end 222 of the conveyor 220 and is loaded with proppant material. The conveyor receives proppant from the hopper and carries it upward at an inclined angle to a top end 224. At the top end, the conveyor releases the drawn proppant downward into a blending device 230. Material may be released from the hopper downward onto the conveyor, for example through an ungated (or possibly gated) aperture in the bottom of the hopper. A metering gate located in the bottom of the hopper may be provided for purposes of controlling the flow of material onto the conveyor. In various embodiments, the material flow rate can additionally or alternatively be controlled by a mechanism on a loading vehicle which supplies the material. The hopper can have a relatively wide open top and a narrow bottom with an aperture, with the hopper being tapered inward toward the bottom to guide proppant into the aperture. The aperture is placed overtop of the conveyor. The conveyor is enclosed by a housing, which retains proppant material in order to mitigate contamination, proppant loss, and dust inhalation safety concerns. Such covering may mitigate safety issues such as silicosis, for example.

In some embodiments, the proppant material can be supplied downward into the hopper, for example directly from a (e.g. bottom) opening of a transport trailer container, or from other material handling or storage equipment, such as a conveyor, silo, or combination thereof. The hopper can be located sufficiently low to ground for the material to be supplied from its source, and the inclined conveyor can function to lift the proppant material from this low received position.

The weigh scale system includes a scale configured to measure weight, which is coupled to the conveyor 220, or to the hopper 210, or to a combination thereof. The weigh scale system can be integrated with the conveyor 220, for example attached to and supporting the conveyor rollers. In some embodiments, the weigh scale system can be contained within the conveyor housing, and may directly support parts of the conveyor, for example the rollers. In other embodiments, part or all of the conveyor and/or hopper may be supported from beneath by support posts which in turn are supported by the weigh scale. Alternatively, the conveyor and/or hopper may be supported from beneath by support beams or cables which in turn are supported by the weigh scale. Optionally, parts of the conveyor, e.g. the top portion, can extend sideways outward from the support posts or beams, so that these parts are not directly supported from underneath but are still supported and weighed by the weigh scale. The weight of the fixed components (e.g. conveyor, hopper, and/or other components of the blender unit) that are supported by the weigh scale can be known and subtracted from any weight calculation in a taring operation.

In some embodiments, the weigh scale system may include multiple separate scales, each configured to support and weigh a portion of the conveyor and/or hopper. Readings of the multiple scales are added together to determine a total weight of proppant material currently present. In some embodiments, the weigh scale can be associated with one, two or more rollers of the belt conveyor. The rollers or associate section of the conveyor are supported by a support means that includes the weigh scale(s) in line with same. This creates an active monitoring section of the belt conveyor at which material is weighed. As material is carried upward by the conveyor through the active monitoring section, the amount of the material in this section is monitored by weight. This information is used as input to a computation which determines the amount of material being delivered to the blender device. As such, one or more idler (or powered) rollers of the conveyor may be mounted on weigh scales. That is, each end of a roller may be rotatably coupled to a respective support post, with the two support posts being mounted to the top of and supported by a weigh scale.

In a simplified, example mode of operation, the conveyor and/or hopper can receive one entire batch of proppant at a time. Each batch is weighed separately and the results are tracked, for example by a computer coupled to the weigh scale or by an operator reading the weigh scale. In another mode of operation, the conveyor and/or hopper can receive proppant intermittently or on a continuous basis, possibly at a variable rate. Weight of the material can be tracked at a given frequency, or substantially continuously, to provide a series of weight measurements over time. These measurements can be combined with other indications, such as the speed of the conveyor, according to a predetermined formula, to provide an indication of weight of material being provided into the blending or mixing device as a function of time. Proppant can be delivered substantially continuously but at a variable rate, with the rate of delivery being monitored continuously through measurements such as weigh scale measurements and conveyor belt speed information (e.g. from a belt speed measurement device).

Figure 3:
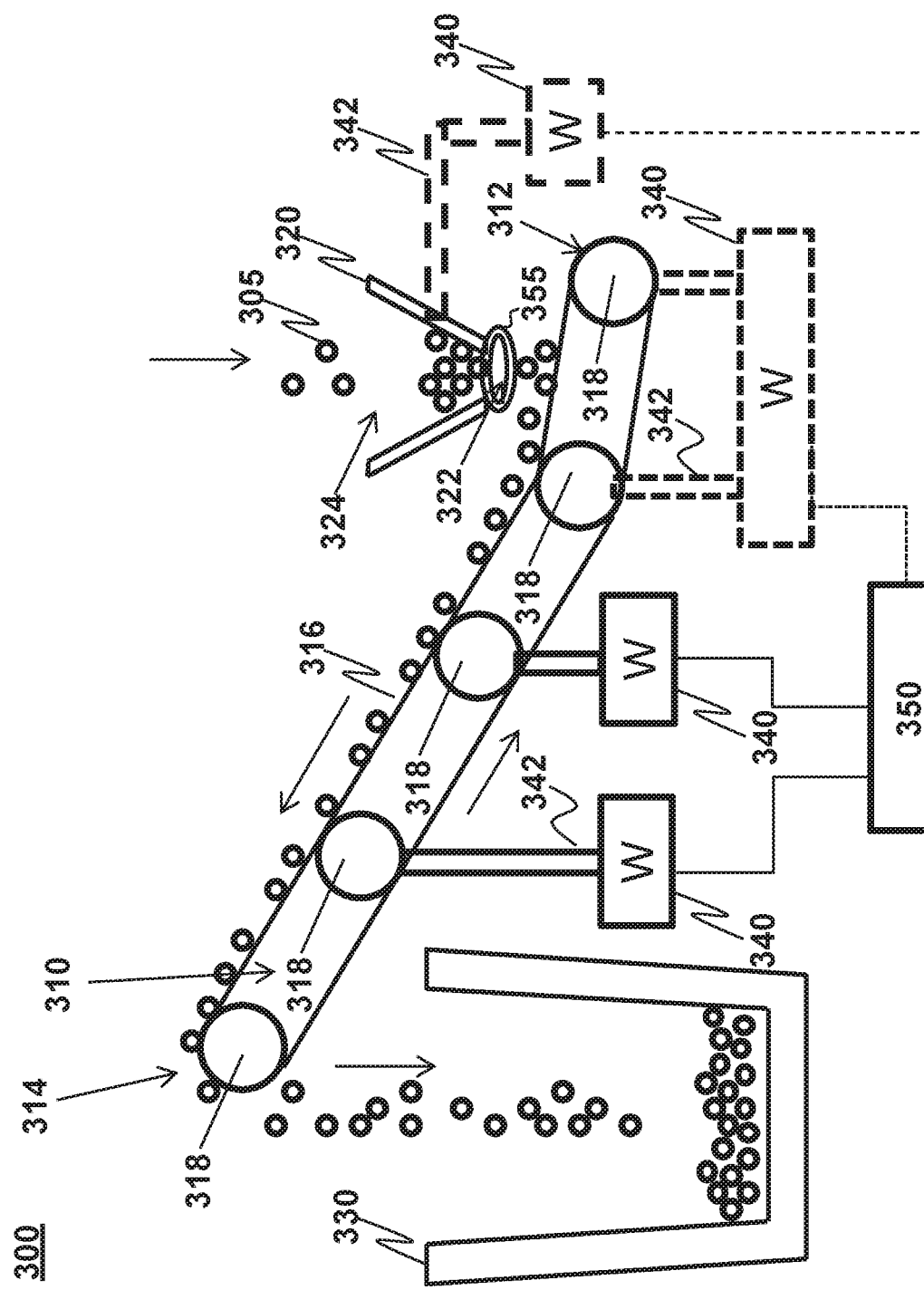
FIG. 3 schematically illustrates a proppant metering and loading apparatus for a hydraulic fracturing blender unit, according to an embodiment of the present invention.

FIG. 3 schematically illustrates a proppant metering and loading apparatus 300 according to an embodiment of the present invention. At a bottom end 312 thereof, a continuous loop belt conveyor 310 receives proppant 305 from a hopper 320 and carries it upward to a top end 314 to be dispensed downward into a blending device 330. The hopper 320 has an open bottom 322 for dispensing the proppant onto the conveyor 310, and an open top 324 for receiving material from another source, for example external to the blender. The conveyor 310 has a belt 316 and a plurality of rollers 318. At least one of the rollers is powered by a motor in order to cause the belt to move and carry the proppant upward toward the blender device. The proppant 305 is illustrated as small circular particles for clarity.

A set of weigh scales 340 are shown. However, in some embodiments a single weigh scale or a limited number of weigh scales may be used. The weigh scales shown using non-dashed lines may be used to create an active monitoring section of the conveyor as described above. In this case, two individual weigh scales are connected to two separate rollers. Accordingly, weight of proppant on a section of the conveyor which is supported by the two rollers is measured. This includes but is not necessarily limited to the section of the conveyor directly above and in between the two rollers. The weigh scales can be calibrated with the conveyor being stationary and/or with the conveyor moving, in order to determine how responsive the scales are to load weight at different conveyor locations. The weigh scale attached to the hopper 320 is optional and may be omitted in some embodiments. The weigh scale supporting the lower end of the conveyor underneath the hopper may be omitted in some embodiments. In the presently illustrated embodiment, the hopper 320 and conveyor 310 are substantially fully supported by beams 342 which in turn are supported by the weigh scales. Alternatively, the weigh scales 340 may be located overtop of the hopper 320 and/or conveyor 310 and the hopper and/or conveyor may be suspended therefrom. However, it is considered that in various embodiments weighing of the hopper or its contents is not desirable or performed. This is because the level of material in the hopper may fluctuate significantly, making use of such weight measurements more complex than necessary.

In various embodiments, at least one weigh scale, and possibly a limited number of weigh scales are provided. For example, one or a limited number of rollers of the continuous belt conveyor system may be co-located with weigh scales. Integrating weigh scales with rollers can be performed in a variety of ways. Belt scales, weigh rollers or weigh idlers may be used for this purpose. The belt scale may be a single idler or multi-idler conveyor belt scale, for example.

Other support structures may also be used, for example a combination of support posts and suspension posts or chains. Because the weigh scales support the hopper and/or conveyor, they also support all of the proppant carried thereby, thus allowing the weight of proppant being delivered into the blender device to be accurately measured. The weigh scales can report measurements to a metering computer 350 which is configured to calculate weight of proppant being delivered, delivery rate, or the like, or a combination thereof. The metering computer can combine input from multiple weigh scales as well as input indicative of conveyor belt speed. In other embodiments, the metering computer can additionally or alternatively process other input indicative of the amount of proppant flowing on the conveyor, such as input from optical or radiometric devices. The metering computer can be configured to display results to an operator or automatically adjust operating parameters, such as conveyor belt velocity, flow control gate aperture size on the hopper or source container feeding material to the hopper, water intake rate, etc. in order to maintain a desired mixture of ingredients in the slurry.

As mentioned above, a flow control gate, also referred to as a metering gate, can be provided in at least some embodiments of the present invention. FIG. 3 illustrates an example metering gate 355, which may be controlled by the metering computer 350. The metering gate may be placed upstream from the conveyor belt and configured to control a rate of flow of material (e.g. proppant) onto the conveyor belt. For example, the metering gate can be provided within the hopper, typically at the bottom of the hopper. The metering gate can operate to control the rate of flow of material, by controllably adjusting an aperture size of the metering gate. The adjustments can be made based on feedback such as weight or level measurements at one or more other locations in the system. For example, the aperture size of the metering gate can be automatically controlled based at least in part on the measured rate or amount of proppant delivered by the conveyor belt.

FIG. 4 illustrates a method 400 for loading proppant to a blender device of a hydraulic fracturing blender unit. The method includes transporting 410 proppant from a source location on the hydraulic fracturing blender unit (e.g. a hopper) to a blender device on the hydraulic fracturing blender unit, using a continuous loop conveyor belt. The method further includes measuring 420, using a measurement device (e.g. a weigh scale, optical device or radiometric device) operatively coupled to the continuous loop conveyor belt, an amount (e.g. weight or volume) of the proppant delivered to the blender device by the continuous loop conveyor belt. The method may further include controlling 430 the rate of flow of proppant onto the continuous loop conveyor belt using a metering gate. The step 420 may be performed before, during and/or after steps 410 and 420.

Figure 5A:
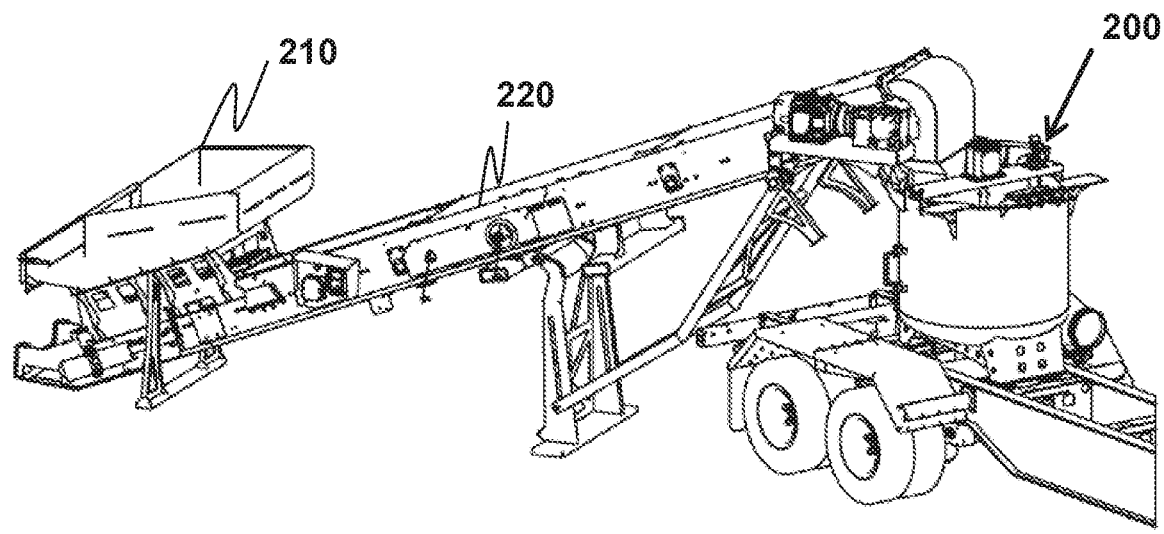
FIGS. 5A and 5B illustrate a metering conveyor positioned adjacent to, but separate from, a hydraulic fracturing blender, according to an embodiment of the present invention.
Figure 5B:
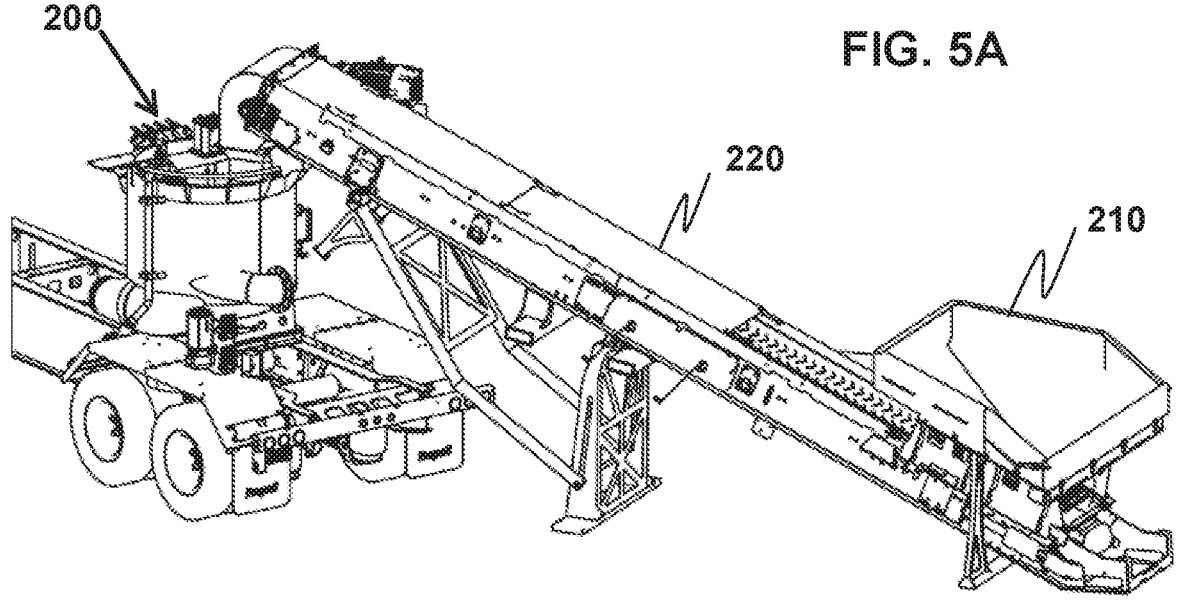

FIGS. 5A and 5B illustrate a metering conveyor 220 positioned adjacent to, but potentially separate from, a hydraulic fracturing blender 200, according to an embodiment of the present invention. As depicted, the position of the metering conveyor 220 may be suitably adjusted around the blender 200, to conform to the environment and availability of space at the operations site.

The metering conveyor can be attached to the blender, e.g. via a pivoting support, or completely separate from the blender. The metering conveyor includes a belt conveyor. A hopper 210 of the metering conveyor is also shown. The hopper may include a controllably adjustable metering gate. The metering conveyor operates as described elsewhere herein. The metering conveyor can include one or more weight sensing devices, such as weigh scales coupled to rollers. Alternatively the entire metering conveyor may be mounted on a weigh scale. The metering conveyor includes supports allowing it to be positioned at the proper angle to raise material upward on an incline.

The metering conveyor can include a controller as discussed elsewhere herein. For example, the controller can adjust the belt rate, metering gate aperture size, or both, based at least in part on weight readings obtained from the one or more weight sensing devices. The metering conveyor can include wired or wireless control interconnects so that the controller can receive or provide other relevant telemetry information, for example from the adjacent blender unit. The telemetry information can include sensor readings, automatic control commands, operator inputs, or a combination thereof. Alternatively, the controller can be separate from the metering scale, e.g. as a stand-alone unit or as part of the blender unit. In this case, the metering conveyor can include wired or wireless control interconnects so that the equipment on the metering conveyor (e.g. belt conveyor and metering gate) can provide telemetry information (e.g. conveyor speed or metering gate aperture size) to the controller, or receive and respond to control commands to adjust operating conditions of the equipment (e.g. conveyor speed or metering gate aperture size).

Figure 6:
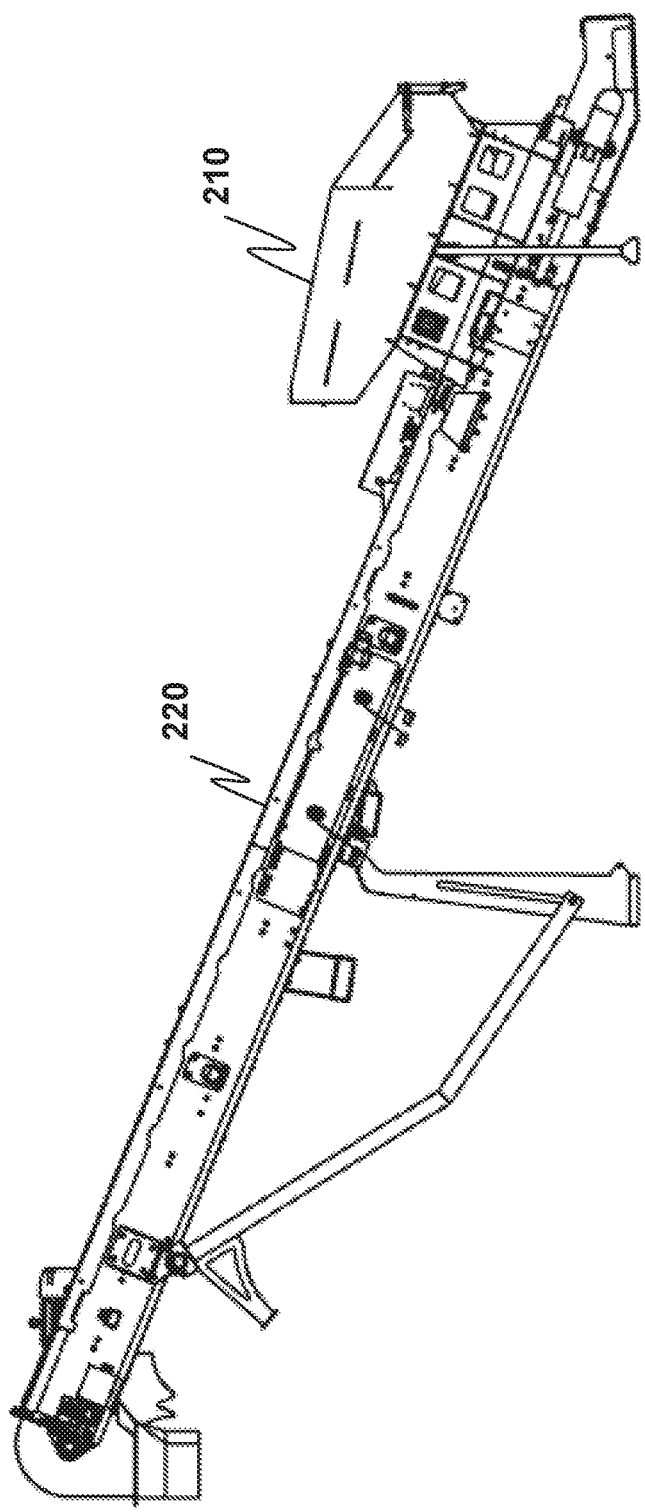
FIG. 6 illustrates a metering conveyor, according to an embodiment of the present invention.

FIG. 6 illustrates a stand-alone metering conveyor 220, according to an embodiment of the present invention. This may correspond to the metering conveyor as depicted in FIGS. 5A and 5B. In some embodiments, the present invention provides for a stand-alone metering conveyor only, but configured for cooperation with a hydraulic fracturing blender. For example, the metering conveyor can include a control system, or suitable control system interconnects.

In various embodiments, proppant amount can be measured by measuring its weight, volume, density, or a combination thereof. Although the above description pertains primarily to the use of a weigh scale, other embodiments can provide for alternative measurement devices for determining amount (e.g. in terms of weight or volume) of proppant delivered via conveyor. For example, an optical scanner can be provided and used to scan the proppant as it moves along the conveyor. The optical scanner can comprise one or more scanning lasers, or a 2d or 3d camera system. The optical scanner can be part of a machine vision system, for example. As another example, a radiometric (radiographic) system (e.g. relying on gamma radiation) can be used to detect proppant volume as it passes through a scanning area located along a portion of the conveyor. A plurality of measurement devices can be used to improve measurement quality.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A proppant metering and loading apparatus for forming a physically separate or integrated part of a hydraulic fracturing blender unit, the apparatus comprising:
   an open-topped hopper disposed proximate to ground level nd configured to receive proppant from a mechanically separate proppant source;
   a continuous loop conveyor belt configured to receive the proppant from the hopper at an intake end of the conveyor belt and deliver the proppant to a blender device at the hydraulic fracturing blender unit at an output end of the conveyor belt opposite the intake end; and
   a measurement device operatively coupled to the continuous loop conveyor belt and configured to provide an indication of an amount of the proppant delivered to the blender device by the continuous loop conveyor belt.

2. The apparatus of claim 1, further comprising a metering gate integrated into the hopper and configured to control a rate of flow of the proppant onto the continuous loop conveyor belt.

3. The apparatus of claim 2, further comprising a controller configured to adjust one or both of: rate of motion of the continuous loop conveyor belt and aperture size of the metering gate, based at least in part on the indication of the amount of proppant delivered to the blender device.

4. The apparatus of claim 1, wherein the measurement device is a weigh scale.

5. The apparatus of claim 4, wherein the weigh scale is coupled to support one or more rollers of the conveyor belt, to create an active monitoring section of the conveyor belt at which the proppant can be weighed.

6. The apparatus of claim 1, wherein the continuous loop belt conveyor is inclined to deliver the proppant upward from a source location.

7. The apparatus of claim 1, wherein the indication of the amount of proppant delivered to the blender device includes an indication of a rate of delivery of the amount of proppant to the blender device.

8. The apparatus of claim 1, wherein the continuous loop conveyor belt is adjacent to the hydraulic fracturing blender unit.

9. The apparatus of claim 1, wherein the continuous loop conveyor belt is operatively coupled to the hydraulic fracturing blender unit.

10. A hydraulic fracturing blender unit comprising the proppant metering and loading apparatus of claim 1.

11. A method for loading proppant to a blender device of a hydraulic fracturing blender unit, the method comprising:
   receiving, using an open-topped hopper disposed proximate to ground level, proppant from a mechanically separate proppant source;
   transporting proppant from an output of the open-topped hopper to a blender device at the hydraulic fracturing blender unit, using a continuous loop conveyor belt at the hydraulic fracturing blender unit; and
   measuring, using a measurement device operatively coupled to the continuous loop conveyor belt, an amount of the proppant delivered to the blender device by the continuous loop conveyor belt
   wherein the open-topped hopper, the continuous loop conveyor belt and the measurement device form a part of the hydraulic fracturing blender unit which is physically separate from or integrated with the blender device.

12. The method of claim 11, further comprising controlling the flow of the proppant onto the continuous loop conveyor belt using a metering gate integrated into the hopper.

13. The method of claim 12, further comprising controlling said flow at least in part by adjusting one or both of: rate of motion of the continuous loop conveyor belt and aperture size of the metering gate, based at least in part on the indication of the amount of proppant delivered to the blender device.

14. The method of claim 11, wherein the measurement device is a weigh scale.

15. The method of claim 14, wherein the weigh scale is coupled to support one or more rollers of the conveyor belt, to create an active monitoring section of the conveyor belt at which the proppant can be weighed.

16. The method of claim 11, wherein the continuous loop belt conveyor is inclined to deliver the proppant upward from a source location.

17. The method of claim 11, further comprising providing, as an indication of the amount of proppant delivered to the blender device, an indication of a rate of delivery of the amount of proppant to the blender device.

18. The method of claim 11, wherein the continuous loop conveyor belt is adjacent to the hydraulic fracturing blender unit.

19. The method of claim 11, wherein the continuous loop conveyor belt is operatively coupled to the hydraulic fracturing blender unit.

* * * * *